UNITED STATES PATENT OFFICE.

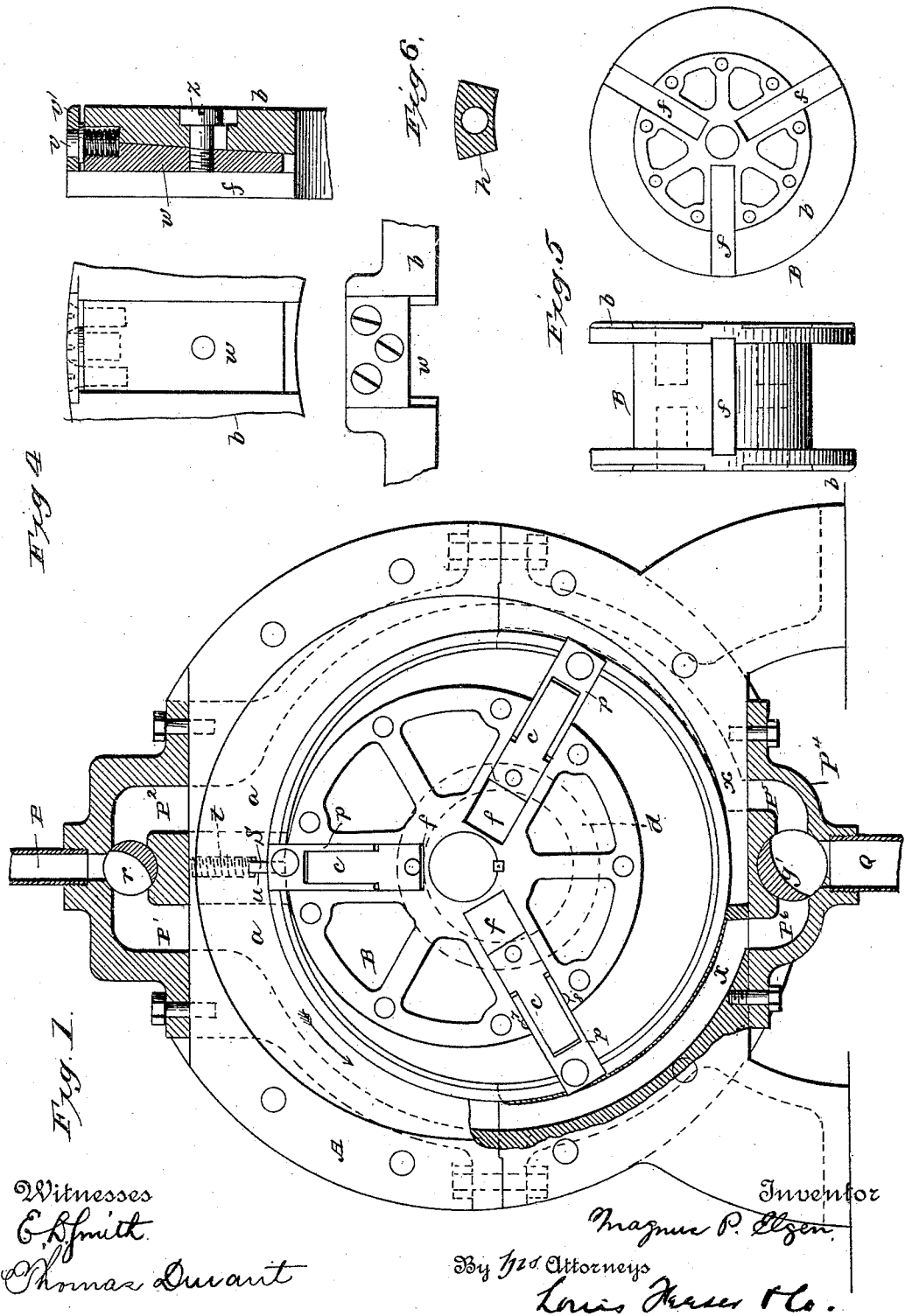

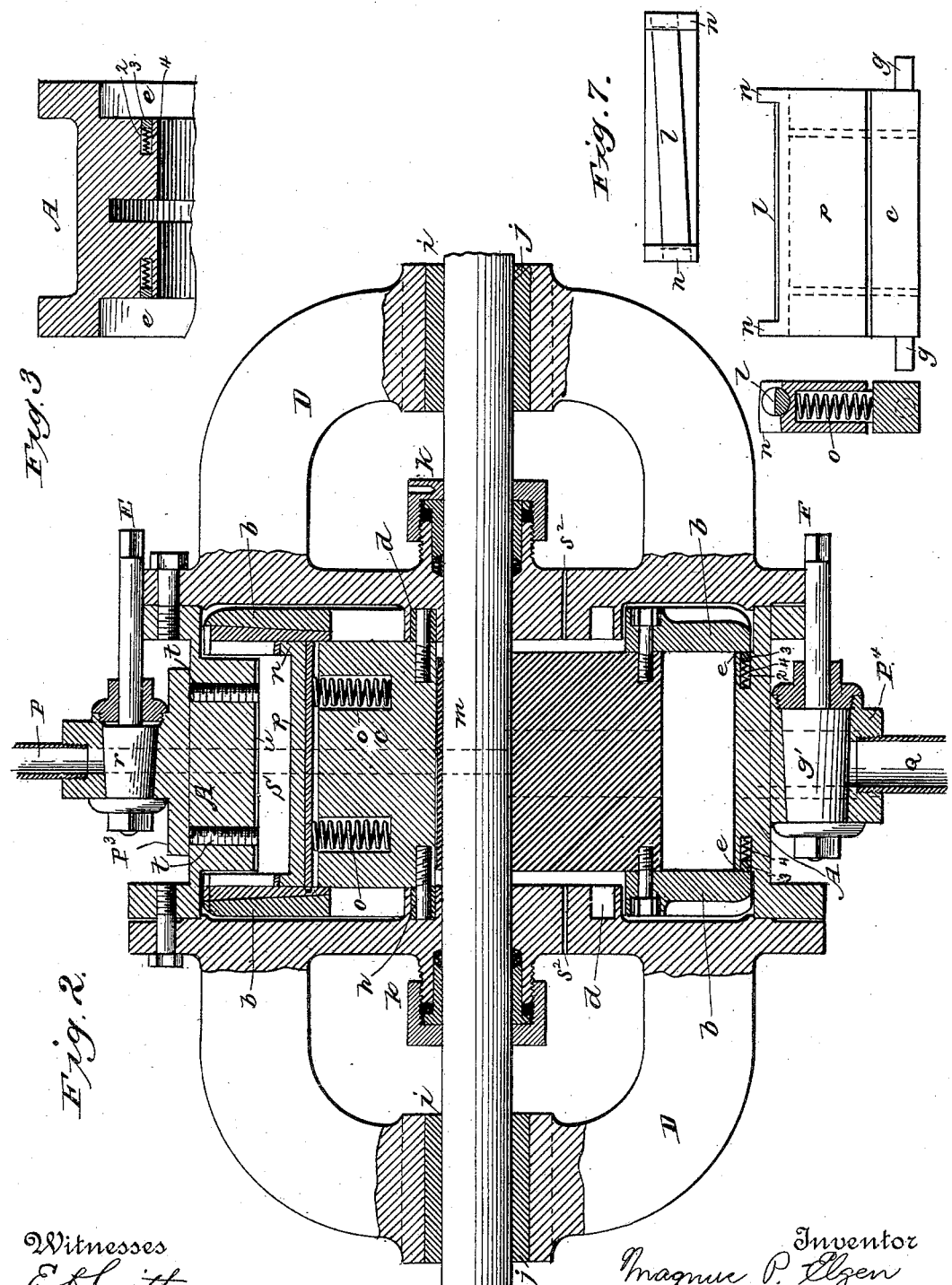

MAGNUS PEDER ELGEN, OF ST. PAUL, MINNESOTA, ASSIGNOR OF SEVEN-EIGHTEENTHS TO THORKILD WILSON, THEODORE GRUTLING, LOUIS ELGEN, HANS J. NELSON, AND CHARLES JOBNKE, ALL OF SAME PLACE.

ROTARY ENGINE.

SPECIFICATION forming part of Letters Patent No. 448,213, dated March 17, 1891.

Application filed December 16, 1889. Serial No. 333,954. (No model.)

*To all whom it may concern:*

Be it known that I, MAGNUS PEDER ELGEN, of St. Paul, in the county of Ramsey and State of Minnesota, have invented certain new and useful Improvements in Rotary Engines; and I do hereby declare the following to be a full, clear, and exact description of the same, reference being had to the accompanying drawings, forming a part of this specification, and to the figures and letters of reference marked thereon.

This invention relates more particularly to improvements in that class of rotary engines in which steam or other fluid under pressure is caused to operate within a pressure-chamber upon a rotary piston carying a series of radial abutments; and it consists in the novel and improved construction, combination, and arrangement of parts hereinafter described, and pointed out in the claims.

In the accompanying drawings, illustrating the preferred embodiment of my said invention, Figure 1 is a side elevation, partly in section, of the engine, one head and piston-flange being removed to show the interior. Fig. 2 is a transverse central vertical section. Fig. 3 is a sectional view of the cylinder. Fig. 4 represents in elevation, section, and plan view one of the adjustable packings for the sliding abutments. Fig. 5 is a detail view representing the piston in edge elevation and a side view with one flange removed. Fig. 6 is an end view of one of the cam-boxes. Fig. 7 is a detail view representing side, plan, and sectional views of one of the sliding abutments.

Similar letters and numerals of reference in the several figures indicate the same parts.

The pressure-chamber, wherein the steam is caused to operate, is formed between the cylinder A and the rotary piston, the latter being formed or provided with parallel side flanges overlapping the sides of the cylinder and being mounted upon an axis to one side of the axis of the cylinder, thus forming a crescent-shaped chamber bounded between the inner face of the cylinder, the periphery of the central head B, and the side flanges $b$ carried by said head B. The cylinder A, mounted upon suitable supports, is formed with parallel ends or faces $e$, as by grooving the sides of the cylinder. The piston is composed of the central cylindrical part or head B, keyed or otherwise suitably secured to a shaft $m$, eccentric to the axis of the cylinder and provided with flanges $b$, preferably made separate from and detachably secured to the sides of the head B, said flanges projecting some distance beyond the periphery of the head B and overlapping the faces $e$ of the cylinder. The head B is formed with a series of radial grooves $f$, and the flanges $b$ are also grooved on their inner faces, forming guides or ways for the reception of the movable abutments, and by making the flanges $b$ separate and attaching them by bolts or other adjusting devices to the head B they may be adjusted relative to the sliding abutments to compensate for wear and preserve a practically steam-tight joint.

The circular inner face of the cylinder A being eccentric to the periphery of the head B and its flanges, a proper steam-space is formed, which is bridged by the movable abutments $c$ sliding in the ways $f$, formed in the head and flanges.

To the cylinder A and outside of the flanged piston are bolted the heads D D, each formed or provided upon its inner face with a groove $d$, concentric with the axis of the cylinder, for a purpose to be hereinafter explained.

The shaft $m$, carrying the rotary piston, passes through stuffing-boxes $k$ in the heads D, and is supported in bearings $i$, provided with removable bushings $j$. Each of the sliding abutments is constructed in two parts or sections $c\,p$. The inner section $c$ is provided at each end with a pin or journal $g$, engaging one of the boxes $h$ in groove $d$, and the latter being eccentric to the shaft $m$, when the piston is revolved and the boxes are carried around in said grooves, a positive reciprocating movement will be communicated to the section $c$ of the abutments. The other or outer section $p$ of the abutment fits over the outer portion of the section $c$, and is formed or provided with flanges $n$, projecting beyond the inner face of the cylinder A and overlapping the sides $e$, and in the outer face of said section $p$ is formed a half-round seat extending diagonally across the face, within which is located a semi-cylindrical metal packing-strip 1. Between the sections $c\,p$ of the movable abutment and inclosed thereby are two springs $o$, which operate to hold the section $p$ projected with its packing at all times in close contact with the inner surface of the cylinder.

On one side of the cylinder a steam-chest or valve-casing $P^3$ is detachably secured. It contains two steam-passages $P'\,P^2$, communicating at one end with steam-pipe P and at the other with steam-ports $a$ in the cylinder, a valve $r$ being provided for controlling the admission of steam to said passages $P'\,P^2$. On the opposite side of the cylinder is attached a similar steam-chest or valve-casing $P^4$, containing passages $P^5\,P^6$, communicating with exhaust-ports $x$ at one end and with exhaust-pipe Q at the other, a valve $g'$ serving to open and close communication between said passages $P^5\,P^6$ and the exhaust-pipe.

The two inlet or live-steam ports $a$ extend in the form of narrow channels along the inner face of the cylinder and in opposite directions from passages $P'\,P^2$ to about the horizontal center-line of the cylinder, and the exhaust-ports $x$ open into the cylinder at the ends of these inlet-ports $a$, as clearly indicated in Fig. 1.

Beneath the steam-chest or valve-casing $P^3$ on the inlet side of the cylinder, and at the point where the revolving piston approaches the surface of the cylinder between the inlet-ports $a$, a groove $u$ is formed in the cylinder for the reception of a metallic packing-strip S, to which suitable adjusting devices are applied—such, for example, as set-screws $t$ inserted through the cylinder and bearing against the packing, said set-screws being located beneath the valve-casing, so that by displacing the latter they will be accessible for effecting the desired adjustment of the packing-strip.

The purpose and operation of the parts thus far described are briefly as follows: Owing to the eccentric arrangement of the rotary piston the steam space or chamber formed between it and the flanged rotary piston is always closed or interrupted at one point, where the piston makes contact with the packing S, between the inlet-ports $a$, and said steam-space is divided into a number of parts or sections equal to the number of the traveling abutments carried by the piston. The walls of the grooves $d$ being concentric with the cylinder operate upon the inner section $c$ of the sliding abutments to project the latter and maintain their outer faces at all times in contact with the inner surface of the cylinder, whereby as the piston rotates the sliding abutments are alternately and progressively projected and retracted, to compensate for the eccentric arrangement of the piston. The cam $d$ operates upon the inner and heavier section $c$ of the abutment, to reciprocate the latter, while the contact between the face of the abutment and the cylinder is maintained by the springs interposed between the two sections $c\,p$. It will be observed that the inner heavier section of the abutment, which is most subject to centrifugal action, is positively controlled in its movements by the surfaces of the cam $d$, while the lighter section, least subject to centrifugal action, is held by the springs in contact with the surface of the cylinder, thereby forming and maintaining a tight joint and compensating for wear and irregularities in the surface of the cylinder. By making the packing-strip 1 semi-cylindrical in cross-section and inserting it in a correspondingly-shaped seat in the sliding abutment it is rendered free to accommodate itself to the inner surface of the cylinder with which it makes contact, while the diagonal position of the packing-strip facilitates self-adjustment and renders the movement easy. When the valves controlling the inlet and exhaust passages are adjusted to the position represented in Fig. 1, the engine is in condition to rotate in the direction indicated by the arrow. Steam is admitted into passage $P'$ on the left of packing S, and enters through the port $a$ (the exhaust-port $x$ on that side being cleared) into the steam space or chamber within the cylinder, where it operates upon the piston to rotate the latter. The steam continues to operate in the spaces between the sliding abutments until each of the latter in its movement uncovers the exhaust-port $x$ on the opposite side of the cylinder, and when this occurs the abutment in rear of the one thus uncovering the exhaust-port has passed beyond the extremity of the inlet-port $a$ and a third abutment has also passed the packing S, whereby the steam is caused to act continuously and with full force upon the piston from the time it enters through the inlet-port on one side until it is discharged through the exhaust-port on the opposite side of the cylinder. When it is desired to reverse the engine, it is only necessary to reverse the position of the inlet and exhaust valves $r$ and $g'$ to close passages $P'$ and $P^5$ and open passages $P^2$ and $P^6$ by means of suitable handles affixed to the valve-stems E and F.

In operating an engine of this kind the surfaces moving in contact are subjected to considerable wear, and unless special provision is made for compensating for or taking up the wear the joints will open, permitting the escape of steam and consequent diminution of power. To provide against this, the ends or faces of the cylinder are provided with grooves 2 for the reception of metallic packing-rings or sections 3, held projected and in contact with the flanges $b$ on the piston by springs 4, so that a steam-tight joint is formed and maintained between the flanges of the piston and the faces or ends of the cylinder embraced thereby. The packing-rings 3 are grooved or cut away to receive the packing-strip S, by which means they are held from rotating with the piston. The flanges $b$ of the piston are also provided with adjustable packings or bearing-plates for the reciprocating abutments. The grooves or ways $f$ in said flanges are each formed with an inclined wall opposite the end of the abutment to receive and co-operate with the inclined rear face of a wedge-shaped packing-strip $w$, against which the end of the abutment bears and operates. This wedge-shaped piece $w$ is moved longitudinally for adjustment by means of a screw $v$, engaging a thread in said piece $w$ and held within a recess in the flange by a cap-plate $v'$, through an opening in which access is had to said screw $v$. By turning the screw the wedge-shaped piece can be advanced or retracted so as to form a steam-tight joint with the abutment. The piece $w$ is secured in place after adjustment by a bolt $z$, passing through an elongated slot or opening in the flange and threaded into the piece $w$. The groove or ways $f$ in front and rear of the sliding abutments may also be provided with packing-strips inserted in grooves 7 and 8 in the piston, as indicated in Fig. 1.

The lubricant for the working parts is forced, as by a pump, through suitable passages $s^2$ in the heads D and distributed by the rotating piston over the surfaces of the moving pawls and conducted through suitable oil-holes in the sliding abutments to the interior surfaces.

Although reference has been made to the employment of steam as the motive power for this engine, it is obvious that any other fluid under pressure may be employed.

Having thus described my invention, what I claim as new is—

1. In a rotary engine, the combination, with the cylinder having the annular recesses within the same in the cylindrical wall thereof and concentric with the shaft, the packing in the sides of the recesses, the steam-passages, the ports at top and bottom, and the shaft journaled eccentrically within the cylinder, of the piston mounted on said shaft, the annular flanges on the piston projecting into the recesses in the cylinder and bearing against the packing therein, the radial recesses in the piston and corresponding grooves in the inside of the flanges, the abutments sliding in said recesses and grooves, and the wedges in the grooves for taking up wear on the abutments, substantially as described.

2. In a rotary engine, the combination, with the cylinder having the annular recesses within the same in the cylindrical wall thereof, the packing-rings in the side walls of said recesses, the steam-passages, the ports at top and bottom, the shaft journaled eccentrically within the cylinder, and the cam-grooves in the heads around the shaft, of the piston mounted on the shaft, the flanges on the piston projecting into the grooves in the cylinder and bearing on the packing-rings in the side walls thereof, the radial recesses in the piston opening out at each end within the flanges, grooves in the inner surfaces of the flanges corresponding to said recesses, and sliding abutments working in said recesses and grooves and having the operating pins or projections extending out at the end of the piston and engaging the cam surrounding the shaft, substantially as described.

3. In a rotary steam-engine, the combination, with the cylinder having the annular recesses in the cylindrical wall, shaft eccentrically journaled in the same, and the cams on the cylinder-heads surrounding the shaft and concentric with the cylinder, of the piston mounted on the shaft, the annular flanges on the piston projecting into said recesses in the cylinder, the radial recesses in the cylinder opening out at each end, the grooves in the inner faces of the flanges corresponding to said recesses and the two-part abutments working in said recesses and grooves, the inner section having the projections beyond the ends of the piston and engaging the cam, and the outer section having the inclines and the wedge-shaped packing-strips adjustably secured thereon and working in the grooves in the flanges, substantially as and for the purpose set forth.

In testimony whereof I have hereunto set my hand in presence of two subscribing witnesses.

MAGNUS PEDER ELGEN.

Witnesses:
 THORKILD WILSON,
 HANS JAKKOB NELSON.